United States Patent [19]

Aslam et al.

[11] Patent Number: 5,424,241
[45] Date of Patent: Jun. 13, 1995

[54] METHOD OF MAKING A FORCE DETECTING SENSOR

[75] Inventors: Mohammad Aslam, Okemos; Michael D. Olinger, Kentwood; Jerry L. Page, Alto, all of Mich.

[73] Assignee: Smiths Industries Aerospace & Defense Systems, Inc., Grand Rapids, Mich.

[21] Appl. No.: 259,395
[22] Filed: Jun. 14, 1994

Related U.S. Application Data

[62] Division of Ser. No. 934,880, Aug. 21, 1992.
[51] Int. Cl.$^6$ ............................................. H01L 21/20
[52] U.S. Cl. ........................................ 437/89; 437/90; 437/165; 313/352
[58] Field of Search ......................... 437/89, 90, 165; 313/351

[56] References Cited

U.S. PATENT DOCUMENTS

| | | | |
|---|---|---|---|
| 3,665,241 | 5/1972 | Spindt et al. | 313/351 |
| 3,755,704 | 8/1973 | Spindt et al. | 313/351 |
| 3,789,471 | 2/1974 | Spindt et al. | 313/351 |
| 3,812,559 | 5/1974 | Spindt et al. | 313/351 |
| 4,141,405 | 2/1979 | Spindt | 427/2.51 |
| 4,566,023 | 1/1986 | Hansma et al. | |
| 4,638,669 | 1/1987 | Chou | 73/517 R |
| 4,857,799 | 8/1989 | Spindt et al. | 313/495 |
| 4,952,526 | 8/1990 | Pribat et al. | 437/89 |
| 5,009,111 | 4/1991 | West et al. | 73/517 R |
| 5,015,912 | 5/1991 | Spindt et al. | 313/495 |
| 5,048,319 | 9/1991 | Neuhaus | 73/517 R |
| 5,064,396 | 11/1991 | Spindt | 445/50 |
| 5,079,958 | 1/1992 | Takase et al. | 73/150 R |
| 5,089,292 | 2/1992 | MaCaulay et al. | 627/78 |
| 5,103,682 | 4/1992 | Moreland et al. | 73/701 |
| 5,162,255 | 11/1992 | Ito et al. | 437/89 |
| 5,163,328 | 11/1992 | Holland et al. | 73/717 |

FOREIGN PATENT DOCUMENTS

| | | | |
|---|---|---|---|
| 57-37829 | 3/1982 | Japan . | |
| 0037829 | 3/1982 | Japan | 437/89 |
| 0093219 | 6/1983 | Japan | 437/89 |
| 58-93219 | 6/1983 | Japan . | |
| 58-93223 | 6/1983 | Japan . | |
| 0093223 | 6/1983 | Japan | 437/89 |
| 0028356 | 2/1984 | Japan | 437/89 |
| 59-28356 | 2/1984 | Japan . | |
| 0018148 | 1/1986 | Japan | 437/89 |
| 61-18148 | 1/1986 | Japan . | |
| 0217910 | 8/1989 | Japan | 437/89 |
| 1-217910 | 8/1989 | Japan . | |

OTHER PUBLICATIONS

Knodle, "MBE to Set Standard for Epitaxial Deposition?", *Research & Development*, vol. 28, p. 73, Aug. 1986.
Studt, "Grow and Analyze Complex Materials Like Never Before", *Research and Development*, vol. 32, No. 5, p. 88, May 1990.
Kenney et al., "A Micromachined Silicon Electron Tunneling Sensor", *IEEE*, pp. 192–196, 1990.
Lee and Huang, "A Theoretical Study on Field Emission Array for Microsensors", *IEEE Transactions on Electron Devices*, vol. 39, No. 2, pp. 313–324, Feb. 1992.

*Primary Examiner*—Nam Nguyen
*Assistant Examiner*—Ramamohan Rao Paladugu
*Attorney, Agent, or Firm*—Varnum, Riddering, Schmidt & Howlett

[57] ABSTRACT

A force detecting microsensor comprises a single crystal Si substrate, a single crystal cone formed on the substrate and a resilient electrode mounted above the tip of the Si cone. The space between the tip of the Si cone and the resilient electrode is maintained in a vacuum environment and the distance between the tip and the resilient anode is in the order of a few atomic diameters. The tunneling effect of electrons occurs between the tip of the Si cone and the resilient electrode when a potential is applied to the resilient electrode and the Si cone tip. The resilient electrode deflects as a result of the force acting on the microsensor. The deflection of the resilient electrode alters the electrical characteristics between the resilient electrode and the Si cone tip. The changes in the electrical characteristics can be measured to determine the level of force acting on the microsensor. The process for making the microsensor according to the invention comprises the steps of forming an insulating layer and support layer on the substrate, forming a recess in the insulating layer and aperture in the support layer, depositing a single crystal Si cone on the substrate and fully enclosing the Si cone within the recess of the support layer and the insulating layer.

12 Claims, 9 Drawing Sheets

METHOD OF MAKING A FORCE DETECTING SENSOR

This is a division of application Ser. No. 07/934,880, filed Aug. 21, 1992, patent pending.

BACKGROUND OF THE INVENTION

1. Field of the Invention

This invention relates to a force detecting sensors and method for making such sensors and, more particularly, to cold-cathode microsensors.

2. Description of Related Art

Force detecting sensors are an integral component of a wide variety of control systems such as accelerometers, pressure sensors, tactile sensors and vibration sensors. In many applications, such as an accelerometer for spacecraft navigational systems, minimizing the weight and size of the force detecting sensor is critical. In addition, force sensors are preferably relatively low cost items produced by cost effective processes.

Force sensors typically include a movable member which is deflected when a force, e.g., the force of acceleration, is applied to the movable member. An electrical circuit senses the amount of displacement or change of position of the movable member and generates an output signal indicative of the applied force. Integrated circuit technology is used in the production of small scale, highly sensitive force sensors. A number of studies have been made in recent years in the field of cold-cathode solid state microsensors in which the movable member is used as an electrode and variations in current flow or field strength between the movable member and fixed electrode are used as a measure of displacement of the movable member. The so-called electron tunneling effect may be used to detect very small displacements.

Electron tunneling was first observed in the 1950s and since has been incorporated into numerous solid state structures. Electron tunneling occurs when potential is applied between conducting electrodes separated by a few atomic diameters within a vacuum environment and increases with decreasing electrode separation. A vacuum tunnel junction is one of the most sensitive position-detection mechanisms available, For example, a decrease in electrode separation in a vacuum tunnel junction of approximately 3 Angstroms produces a thousand-fold increase in electron tunnel current.

In an article by Kenny et al. entitled "A Micro Machine Silicon Electron Tunneling Sensor", *IEEE*, April 1990, p. 192, the authors disclose a prototype position-detection mechanism employing the electron tunneling effect to detect displacement. One described arrangement incorporates an aluminum mounting block to support a piezoelectric cantilever having a gold film electrode spaced apart from a gold, cold-cathode tunneling tip. This piezoelectric system is difficult and expensive to fabricate. In addition, the system is extremely sensitive to thermal drifts and hysteresis. Sensors having metal cathode emitters also suffer from the adsorption of work function raising impurities on the surface of the emitter. In addition, thermal mismatch between the metal cathode and the substrate can lead to cathode failure.

Kenny et al. further disclose a micro-machined Si wafer tunnel sensor composed of single crystals of Si. A folded cantilever spring of Si is created in a single Si wafer by etching. A gold film is evaporated onto the spring to make electrical contact to the tunneling electrode and a tunnel tip is formed by applying indium solder with an iron and then evaporating a gold film over it. According to the authors, the actual shape of the electrode in this structure is unimportant.

A theoretical study for field emission emitter array diodes is discussed by Lee et al. in "A Theoretical Study on Field Emission Array For Microsensors", *IEEE Transactions on Electron Devices*, Vol. 39, No. 2, p. 313, February 1992. The proposed structure disclosed in the theoretical study comprises a plurality of cone or wedge-shaped emitter arrays mounted below a single Si diaphragm.

What is not seen in the prior art of microsensors is a force detecting sensor which is practical to manufacture and not cost prohibitive, but which will supply the necessary sensitivity required for use in accelerometers, microsensors and vibration sensors.

SUMMARY OF INVENTION

The microsensor according to the invention comprises an electrically conductive substrate, a resilient electrode spaced apart from the substrate and a single crystal stationary electrode in electrical contact with the substrate and comprising an electrode tip extending toward the resilient electrode and spaced apart from the resilient electrode by a predetermined distance. In one embodiment of the invention, an insulating layer is disposed between the substrate and the resilient electrode, and the stationary electrode is disposed in a recess of the insulating layer. Electrical terminals, connected to the resilient electrode and the substrate, provide connection to an electrical circuit whereby the force applied to the sensor can be measured on the basis of the change in electrical characteristics between the resilient electrode and the substrate due to changes in the predetermined distance resulting from deflection of the resilient electrode.

In a particular embodiment of the invention, the resilient electrode comprises a cantilever arm disposed between the first insulating layer and a second insulating layer. A second recess is formed in the second insulating layer above the cantilever arm permitting movement of the cantilever arm. An upper layer is formed on the second insulating layer thereby fully enclosing the cantilever arm within the first and second recesses.

The microsensor according to the invention is formed by a process comprising the steps of forming a first layer of insulating material and a supporting layer on the substrate. The first layer of insulating material is disposed between the substrate and the supporting layer. An aperture is formed in the supporting layer, and a recess is formed in the insulating material adjacent the aperture to expose a portion of the substrate. A stream of semiconductor atoms is directed at the aperture in a direction substantially normal to the exposed portion of the substrate to epitaxially grow a single crystal semiconductor electrode on the substrate. In accordance with one aspect of the invention, the aperture closes in the process of forming the stationary electrode causing the stationary electrode to be formed in the shape of a cone, thereby facilitating the flow of tunneling current between the electrodes. The process may be performed in a vacuum in the range of $10^{-10}$ to $10^{-8}$ Torr, and the aperture is closed in the process to provide a vacuum environment for the electrodes. Furthermore, the process described above can be modified to create a cone having a diameter smaller than the diameter of the aperture. The insulating layer and support layer are formed on the substrate as described above. In addition, the aperture and recess are formed in the support layer and insulating layer as described above. Thereafter, a stream of semiconductor atoms is directed at the aperture and the support layer at an acute angle with respect to the plane of the substrate, causing atoms to be deposited on the support layer and around the aperture thereby narrowing the aperture. After the diameter of the aperture has been narrowed sufficiently, the stream of atoms is directed at the substrate and the support layer at an angle substantially normal to the plane of the support layer and substrate thereby forming the cone and closing the aperture.

In one embodiment of the invention, the process of the invention is used to produce an array of individual sensors by forming a plurality of single crystal electrodes on the substrate and a corresponding plurality of resilient electrodes. The stationary electrodes of the array are connected in parallel, and the resilient electrodes are connected in parallel to form a multielectrode sensor. Such a sensor advantageously provides greater current variations with changes in applied force and provides redundancy which alleviates yield and devices failure problems.

BRIEF DESCRIPTION OF THE DRAWINGS

The invention will now be described with reference to the drawings wherein.

DESCRIPTION OF THE PREFERRED EMBODIMENT

Figure 1:
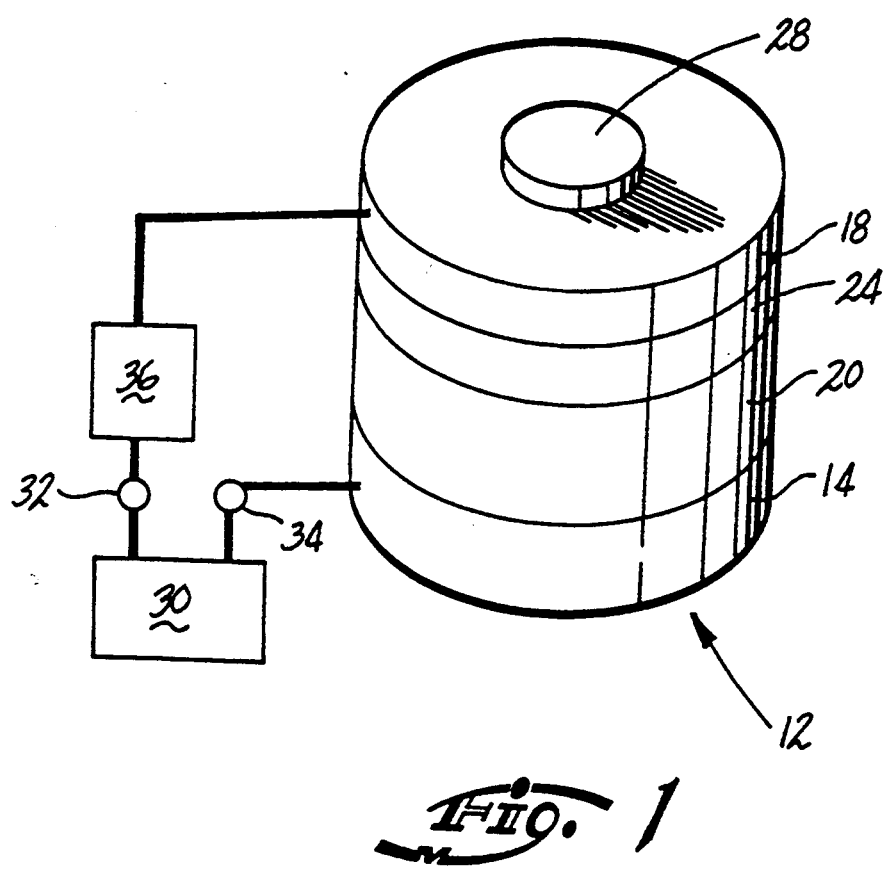
FIG. 1 is a perspective view of a first embodiment of a microsensor according to the invention.
Figure 2:
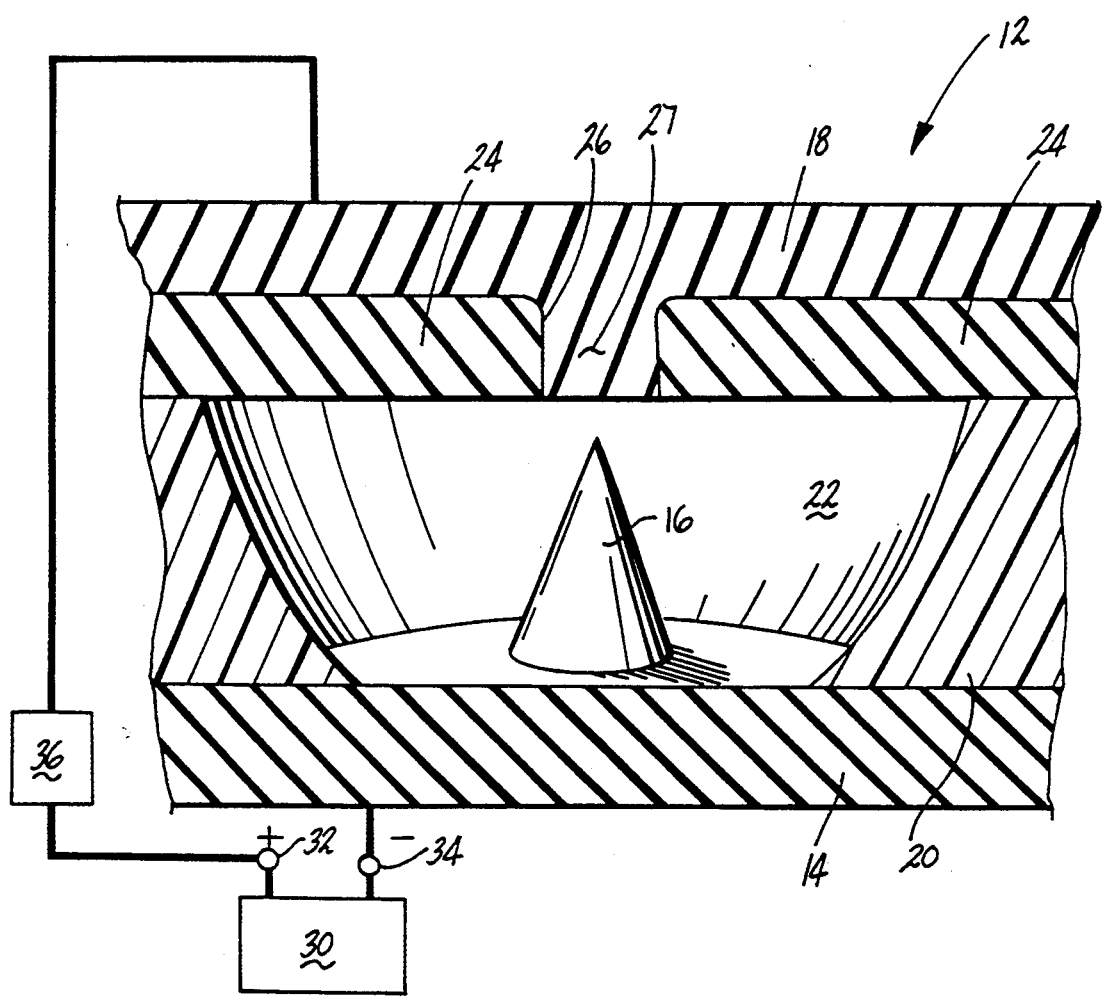
FIG. 2 is a partial sectional, perspective view of the microsensor as seen in FIG. 1.

Referring now to the drawings, and to FIGS. 1 and 2 in particular, a microsensor 12 according to the invention comprises a conductive substrate 14 and a cone 16 formed on the substrate 14. A conductive top member 18 supported above the cone 16, forms the movable deflection member and serves as one of the electrodes of the tunnel sensor. An insulating layer 20 is formed on the substrate 14. A recess 22 is formed in the insulating layer 20 and the cone 16 is disposed within the recess 22. A support layer 24 is formed on the insulating layer 20 such that the support layer 24 is disposed between the insulating layer 20 and the top member 18. An aperture 26 is formed in the support layer 24 immediately adjacent the tip of the cone 16. The support layer 24 is covered by the top member 18 and the aperture 26 is substantially filled by a membrane 27.

The first embodiment of the microsensor 12 according to the invention is suitable for a use in detecting forces applied to the membrane such as acceleration, pressure and vibration.

The substrate 14 and cone 16 are preferably formed of conductive material. This material may be an elemental semiconductor such as Si or a compound semiconductor such as GaAs, AlGaAs, GaP, InP, InSb, InGaAs, InAs, GaSb or AlSb. The microsensor may have an elemental semiconductor cone formed on an elemental semiconductor substrate (e.g. Si cone on Si substrate), a compound semiconductor cone formed on a compound semiconductor substrate (e.g. GaAs cone on a GaAs substrate), or a compound semiconductor cone formed on a compound semiconductor layer which is in turn formed on a elemental semiconductor substrate (e.g. a GaAs Cone formed on a GaAs conductive layer which is in turn formed on a Si substrate).

The preferred embodiment of the microsensor according to invention comprises a Si cone formed on a Si substrate and the following description of the preferred embodiment shall be directed to this structure, it being understood that the above-described semiconductors may be substituted therefore.

The insulating layer 20 of the preferred embodiment is preferably $SiO_2$. The support layer 24 is preferably formed of a poly-Si or $Si_3N_4$ and the top layer 18 is preferably formed of poly-Si.

A constant voltage power source 30 has a positive terminal 32 connected to the top member 18 and a negative terminal 34 connected via the substrate 14 to the cone 16. With this arrangement, the top member 18 is the anode and the cone 16 is the cathode of the sensor. The recess 22 is maintained at a vacuum on the order of $10^{-6}$ Torr and the distance between the tip of the cone 16 and the membrane 27 of the top member 18 may be from 0.25 to 2.00 micrometers. The potential required for tunneling depends on the distance between the cathode and the anode, the shape of the cathode and the work function of the cathode material. The tunneling effect between the Si cathode cone 16 and the anode top member 18, separated by a distance in the specified range, occurs when a potential in the range of 15 to 100 volts is supplied by the power source 30.

As a force is applied substantially normally to membrane 27, the membrane 27 is displaced such that the spacing between the membrane 27 and the cone 16 changes and the magnitude of the tunneling current changes as the membrane 27 moves relative to the cone 16. The change in electron current can be readily detected by a known current sensor 36 providing an electrical output signal indicative of the applied force since the tunneling current varies with the change in spacing in a known manner.

Figure 3:
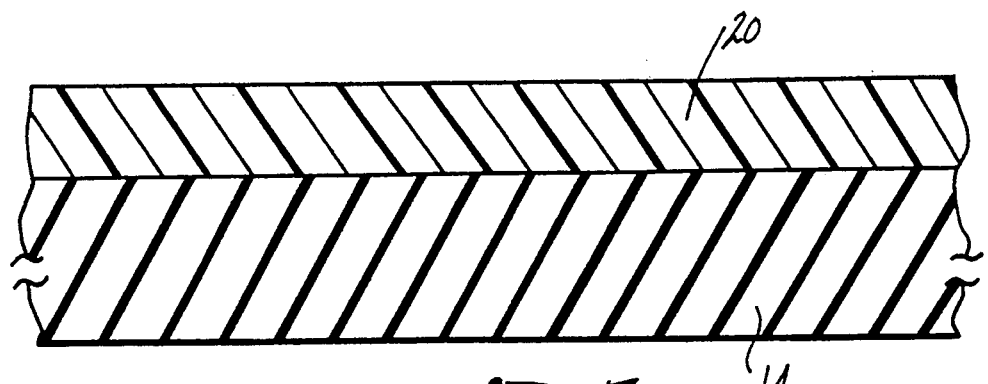
FIG. 3 is a sectional view of a partially completed microsensor after a first step in the method of making a microsensor according to the invention, namely forming an insulating layer on the base member.

The process for manufacturing the first embodiment of the microsensor 12 shown in FIGS. 1 and 2 is seen in FIGS. 3-8. As shown in FIG. 3, the first step in the process for making a microsensor 12 according to the invention is forming the insulating layer 20 on one surface of the Si substrate 14. The insulating layer 20, preferably $SiO_2$, is thermally grown or deposited on the substrate 14 in a well-known fashion in an oxide environment. In the preferred embodiment, the oxide layer is in the range of 1.5 to 2.5 microns thick.

Figure 4:
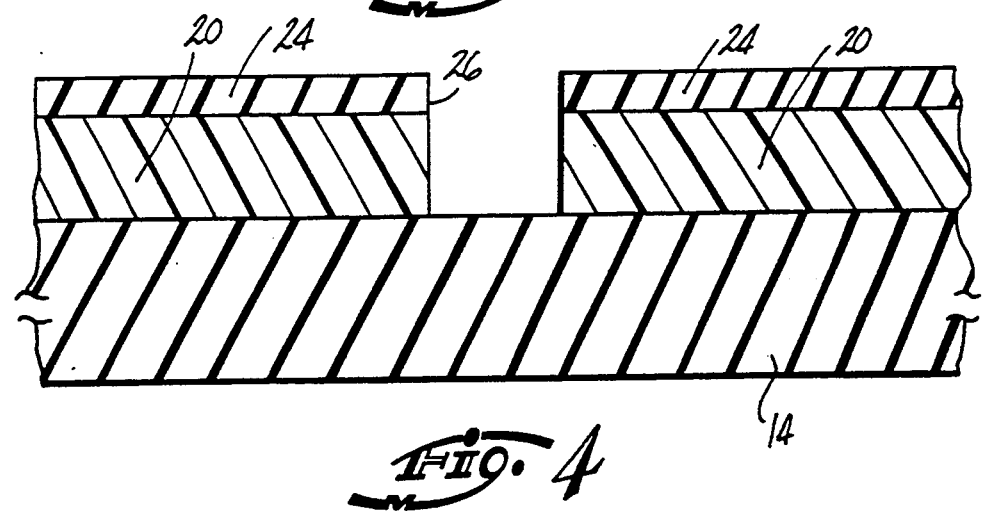
FIG. 4 is a sectional view of a partially completed microsensor after an intermediate step in the method of making a microsensor according to the invention, namely forming a support layer on the insulating layer and forming an aperture in the support layer and insulating layer.

The next step in the process, as seen in FIG. 4, is depositing a polycrystalline film support layer 24 on the insulating layer 20 such that the insulating layer 20 is disposed between the substrate and the support layer 24. Preferably, the support layer 24 is a poly-Si film in the range of 0.8 to 1.5 microns thick and deposited on the insulating layer by a well-known chemical vapor deposition process.

Figure 5:
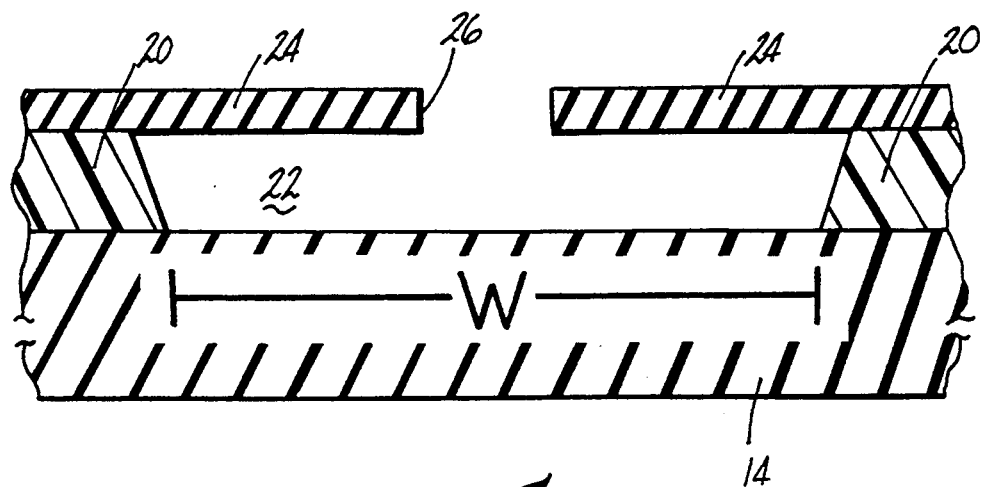
FIG. 5 is a sectional view of a partially completed microsensor after a further step in the method of making a microsensor, namely forming a recess in the insulating layer.

Next, as shown in FIG. 5, the aperture 26 is formed in the support layer 24 and the recess 22 is formed in the insulating layer 20. Preferably the aperture 26 is circular and is in the range of 0.5 to 2.5 microns in diameter. The aperture 26 is preferably formed by dry etching the polycrystalline support layer 24 to form well defined edges and the recess 22 is preferably formed in the oxide insulating layer 20 by wet etching. The recess 22 is preferably circular and has a diameter W but could be any shape. The etching process exposes a portion of the surface of the substrate 14.

Figure 6:
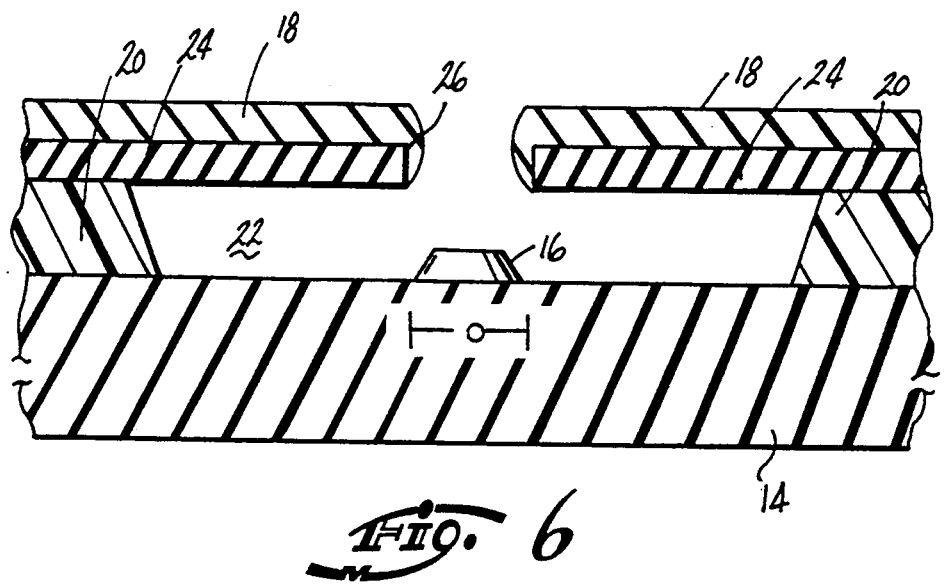
FIGS. 6 and 7 are sectional views of the a partially completed microsensor in a further step in the method of making a microsensor according to the invention, namely depositing silicon or gallium arsenide on the base member and support layer to create a cone on the base member and close the aperture in the support layer.
Figure 7:
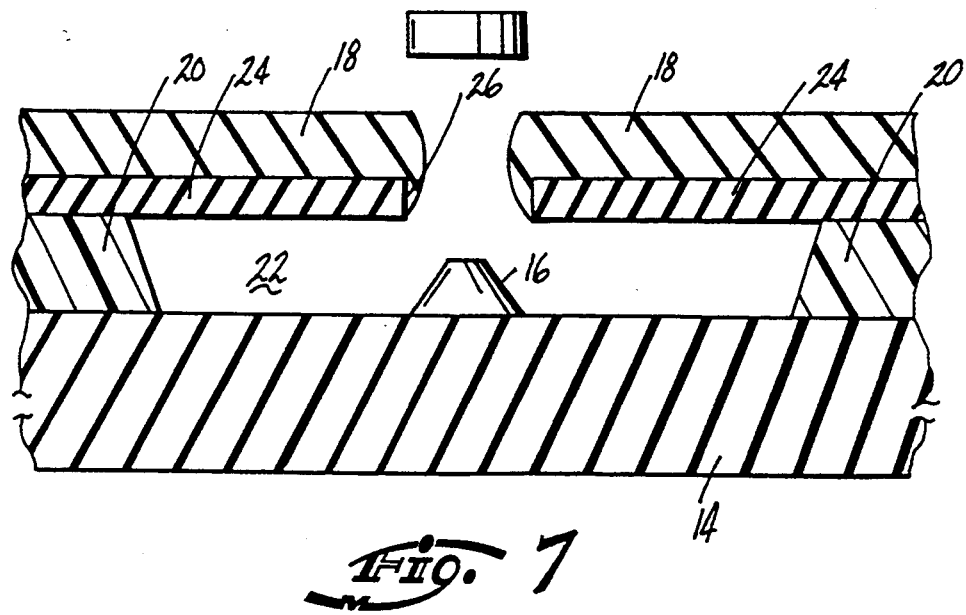
Figure 8:
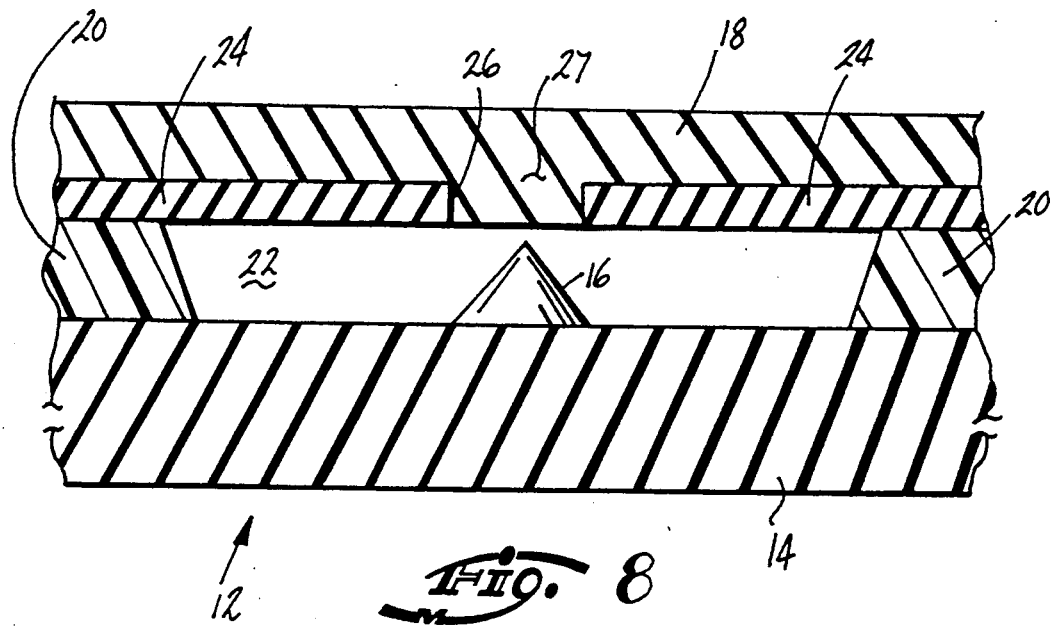
FIG. 8 is a selectional view of the first embodiment of the microsensor according to the invention.

The next step in the method of making the microsensor 12 according to the invention is the growth of the Si cone 16 and the top member 18, as shown in FIGS. 6-8. The structure of the substrate 14, the insulating layer 20 and support layer 24 mounted thereon is placed in a vacuum chamber with a background pressure in the range of $10^{-10}$ to $10^{-8}$ Torr. The Si cone 16 is epitaxially grown on the substrate 14 using a known Molecular Beam Epitaxial (MBE) crystal growing process. The substrate 14 is preferably a single crystal highly n-doped Si substrate. A suitable substrate is a single crystal Si wafer having impurities in the range of $5 \times 10^{19}$ to $7 \times 10^{20}$ impurities per cubic centimeter. Such substrates are commercially available and may be purchased from Wacker Siltronic Corp. of Portland, Oreg.

A well-known Si source 40 in the vacuum chamber emits a stream of Si atoms. The stream of atoms are directed at the aperture 26 substantially perpendicular to the plane of the substrate 14. The substrate is heated to a temperature in the range of 800°-900° C. and emitted Si atoms traveling through aperture 26 epitaxially grow a single crystal structure on the substrate 14. Emitted atoms deposited on the polycrystalline support layer 24 will tend to grow a polycrystalline top member 18.

It is desirable to epitaxially grow an n-doped cone and doping of the cone is accomplished by introducing a suitable doping element, such as phosphorus into the emitter. This results in the introduction of phosphorus atoms into the stream of Si atoms being deposited on the substrate 14 and the support layer 24. The amount of phosphorus atoms present in the stream of Si atoms depends upon the vapor pressure of phosphorus within the emitter. Through this process, doping of the cone is done in situ. The doping can be conducted with any n-doping element.

As seen in FIG. 6, the diameter, b, of the base of the cone 16 is substantially equal to the diameter of the aperture 26. As the Si atoms are deposited on the support layer 24, the diameter of the aperture 26 decreases as seen in FIG. 7. Fewer atoms pass through the aperture and are deposited on the substrate 14 as the aperture 26 gets progressively smaller. This ever decreasing diameter of the aperture 26 results in an ever decreasing area of deposition within the recess 22 and forms a cone-shaped cathode 16. As the deposition of Si continues, the aperture will eventually close, thereby enclosing the cone 16 within the recess 22, as seen in FIG. 8. The cone growth process is conducted in a vacuum environment and the vacuum is maintained within the recess 22 because the cone is sealed within the recess 22.

The important parameters which determine circular plate deflections and vibration modes of the membrane 27 surrounding the aperture 26 are the thickness, diameter, material properties, and boundary conditions. The deflection and vibration motion of the thin circular membrane 27 is characterized by a multitude of circular and diametrical natural mode shapes at differing frequencies. The combination of various mode shapes will influence the membrane-to-tip tunnel gap in response to acceleration. This multi-mode response can be simplified by depositing a circular mass 28 (FIG. 1) on top of the plate centered over the tip. Under acceleration, this mass causes a radially symmetric loading of the plate which helps eliminate unwanted modes. The deposition of the circular mass 28 can be done using standard integrated chip technology.

Figure 9:
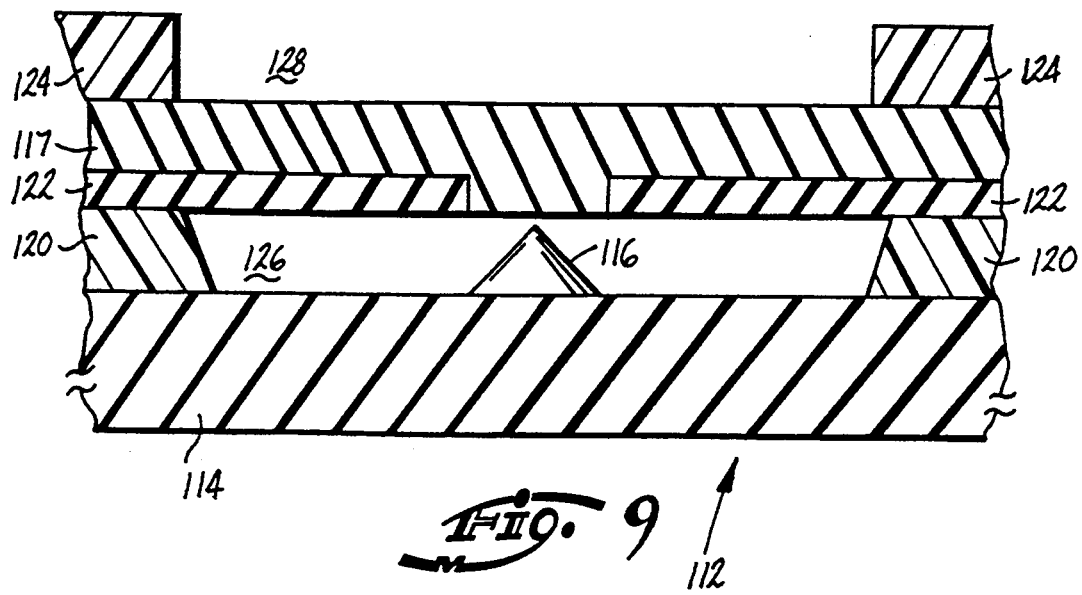
FIG. 9 is a selectional view of a partially completed microsensor showing a step in the method of making a second embodiment of the microsensor according to the invention, namely depositing a second insulating layer on the membrane.
Figure 10:
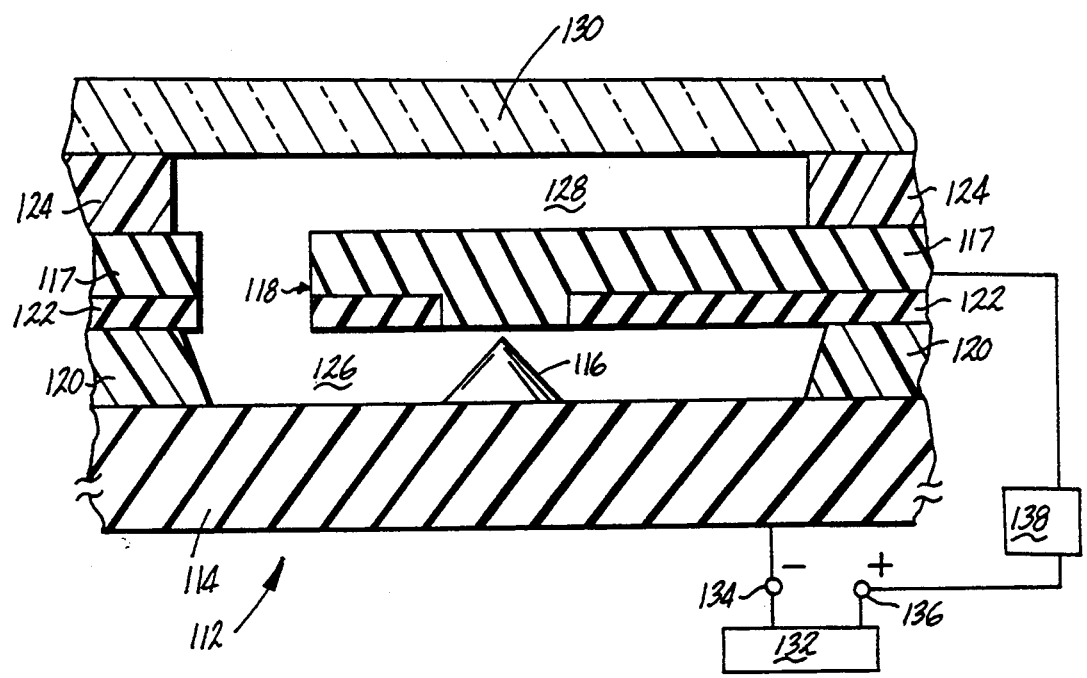
FIG. 10 is a selectional view of a second embodiment of the microsensor according to the invention having a cantilever arm anode.
Figure 11:
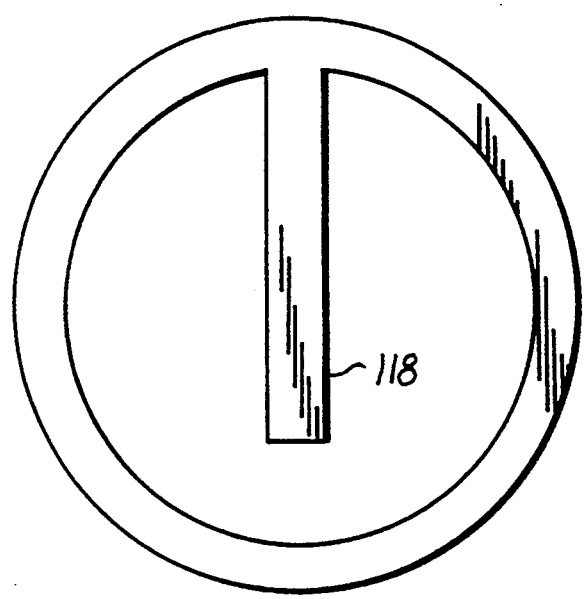
FIG. 11 is a top view of the cantilever arm of the second embodiment of the microsensor according to the invention.

A second embodiment of the microsensor according to the invention, and the process for making the same is seen in FIGS. 9-11. As seen in FIG. 10, the second embodiment of the microsensor 112 comprises a conductive substrate 114, a cone 116 formed on the substrate 114 and a cantilever arm 118 supported above the cone 116. In this embodiment, the cantilever arm 118 comprises one electrode and the cone 116 via the substrate 114 comprises the other electrode of the microsensor. This sensor has primary application as an accelerometer in which acceleration can be determined from deflection of the cantilever arm 118 relative to the cone 116.

Referring to FIG. 9, a first insulating layer 120 is formed on the substrate 114 and a support layer 122 is formed on the first insulating layer 120 by the same process described earlier in the first embodiment. Similarly, the cone 116 is formed on the substrate 114 and an upper layer 117 is formed on the support layer 122 by the previously described processes. After the upper layer 117 has been deposited, a second insulating layer 124 is formed on the upper layer in an oxide environment such that the upper layer 117 is disposed between the second insulating layer 124 and the support layer 122. The substrate 114 and the cone 116 consist of single crystal Si and the upper layer 117 consists of polycrystalline Si. The first and second insulating layers 120, 124, are preferably $SiO_2$ which is formed by heating the microsensor in an oxide environment in a well-known manner. In the preferred embodiment, the second insulating layer is approximately 3.0 to 5.0 microns thick.

Next, a second recess 128 is formed in the second insulating layer 124. The second recess 128 is formed by wet etching the second insulating layer 124 with HF. The wet etching process does not remove or damage any of the exposed upper layer 117. After the creation of the second recess 128, the upper layer 117 is subjected to a dry etching procedure to create the cantilever arm 118. As seen in FIGS. 9 and 10, the cantilever arm 118 extends into the opening created by the first recess 126 and second recess 128. The cantilever arm 118 is suspended above the Si cone 116.

After the formulation of the cantilever arm 118, the top member 130 is formed on the microsensor 112. Preferably, the top member 130 comprises a glass plate secured to the second insulating layer 124. The top member 130 is mounted on the microsensor 112 in a vacuum environment of approximately $10^{-6}$ Torr. Finally, the substrate 14 is electrically connected to the negative terminal 134 of a power source 132 and the cantilever arm 118 is electrically connected to the positive terminal 136 of the power source 132. With this arrangement, the cantilever arm 118 is the anode and the cone 16 comprises the cathode. In light of the vacuum environment in the recesses 126, 128 and the spacing in the range of 0.25 to 2.0 micrometers between the cathode cone 116 and the anode cantilever arm 118, a tunneling effect of electrons results when a potential in the range of 15 to 100 volts is supplied by the power source 132.

The tunneling current between the cathode cone 116 and the anode cantilevered arm 118 will vary as a result of a change in the spacing between the cone 116 and the cantilever arm 118. The cantilever arm 118 flexes as a result of the force applied substantially normal to the cantilever arm 118 and the current changes as a result of the change in spacing between the anode and the cathode. These changes in current can be readily detected by the current sensor 138 in a known manner to provide an output signal indicative of the applied force.

The process for making the microsensor according to the invention can be modified to create cones of varying size in relation to the size of the aperture. As seen in FIG. 6, the diameter b of the base of the cone 16 of the first embodiment is substantially equal to the diameter of the aperture 26 in the support layer 24. A method for making a cone having a diameter b smaller than the diameter of the aperture is described with reference to FIGS. 12 and 13. A third embodiment of a microsensor according to the invention and having a relatively smaller cone is shown in FIG. 13.

As in the first embodiment, the process for making the third embodiment of the microsensor 212 comprises the steps of forming a first insulating layer 216 on the substrate 214 and then forming a support layer 222 on the insulating layer 216 such that the insulating layer 216 is disposed between the support layer 222 and the substrate 214. Next, an aperture 226 having a diameter d is formed in the support layer 222 and the insulating layer 216, as previously described for the first embodiment. Next, the recess 218 is formed in the first insulating layer 216 pursuant to the previously described wet etching process.

Figure 12:
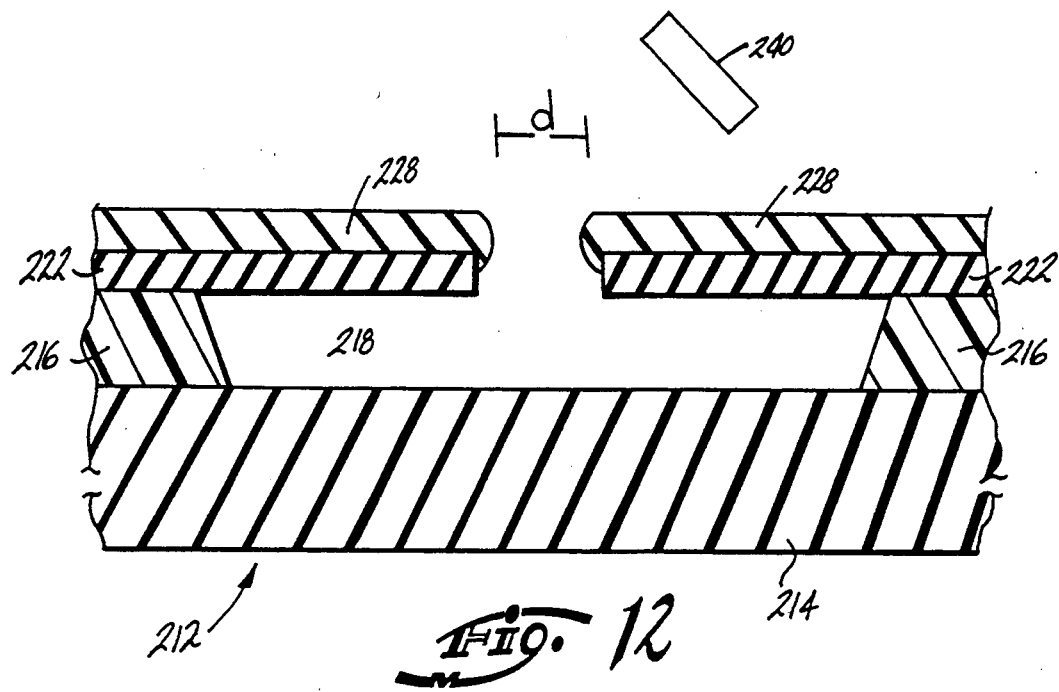
FIG. 12 is a partial sectional view of a microsensor showing a step in the method of making a third embodiment of the microsensor according to the invention, namely narrowing the aperture in the support layer prior to deposition of the Si cone.
Figure 13:
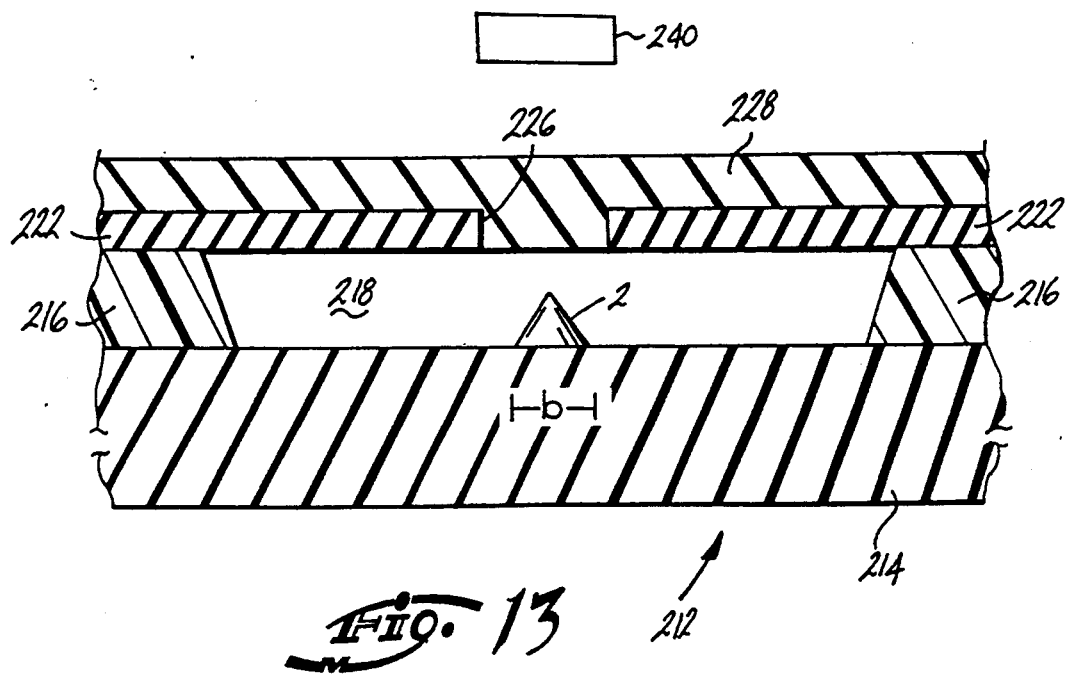
FIG. 13 is a sectional view of a third embodiment of a microsensor according to the invention.

A stream of Si atoms are directed at the support layer 222 and the aperture 226 from a non-aligned emitter 240 as depicted in FIG. 12. The grazing incidence between the plane of the support layer 222 and the direction of the emitter 240 is an acute angle which permits deposition of the Si atoms on the support layer and surrounding the aperture 226, but prevents deposition within the area of the cone in the recess 218. In the preferred embodiment, this angle is approximately 15 degrees. As the stream of Si atoms are directed at the support layer 222 and the aperture 226, the microsensor 212 is rotated relative to the emitter 240. Alternatively, the emitter 240 could be rotated relative to the microsensor 212. In this particular orientation of the emitter 240, the Si atoms are deposited on the support layer 222 and the aperture 226. However, no appreciable amounts of Si atoms are deposited on the substrate 214. With the deposition on the support layer 222, the diameter d of the aperture is decreased. Next, a stream of Si atoms are directed at the substrate 214, support layer 222 and aperture 226 at a direction substantially normal to the substrate 214 as depicted in FIG. 13. As described earlier, this results in the epitaxial growth of a cone 220 immediately below the aperture 226 and the deposition of the membrane 230. However, because the diameter of the aperture 226 has been decreased, the diameter b of the cone 220 is substantially equal to the reduced diameter of the aperture 226. Through the narrowing of the aperture prior to growth of the cone, a greater spacing between the membrane 230 and the tip of the cone 220 is achieved without reduction of the diameter of the membrane 230.

As stated earlier, the potential requirement for the tunneling of electrons between the tip of the cathode cone and the anode is dependent upon the shape of the cathode cone. A cone with a sharp tip will result in a lower required potential than a dull tip. The Si cone of the microsensor according to the invention can be sharpened after deposition of the cone to create a more responsive microsensor suitable for operation at a lower anode voltage. The sharpening process begins after the deposition of the cone 16 and the top member 18. Referring to FIG. 7, once the cone 16 has been deposited, the top member 18 can be removed by wet etching. This exposes the cone 16. Next, the microsensor 12 is thermally heated and subjected to an oxide environment in a well-known manner. $SiO_2$ forms on the entire surface of the cone 16. After the formation of an initial layer of $SiO_2$, oxygen continues to move through the oxide layer to react with the Si to create $SiO_2$. The oxygen moves inwardly through the $SiO_2$ layer at a slower rate at the tip of the cone because of the inherent stresses within the structure of the Si atoms at the tip. Therefore, the thickness of the oxide layer adjacent the base and along the sides of the cone 16 will be thicker than at the tip. Finally, the oxide is removed by a wet etching process resulting in a cone having a sharp tip. In practice, tips having a radius of 10 Angstroms can be obtained utilizing the sharpening process.

After the tip has been sharpened, the top member 18 must be reapplied to the support layer 24. The top member 18 is applied by directing a stream of Si atoms at the support layer 24 and the aperture 26 at an acute angle resulting in deposition of Si atoms only on the support layer 24, in the manner described earlier with reference to FIG. 11. The microsensor is rotated relative to the emitter 40 during the deposition to obtain a uniform layer of Si which fully encloses the cone within the recess 22. Once again, this evaporation process is conducted in a vacuum environment resulting in a vacuum within recess 22.

Figure 14:
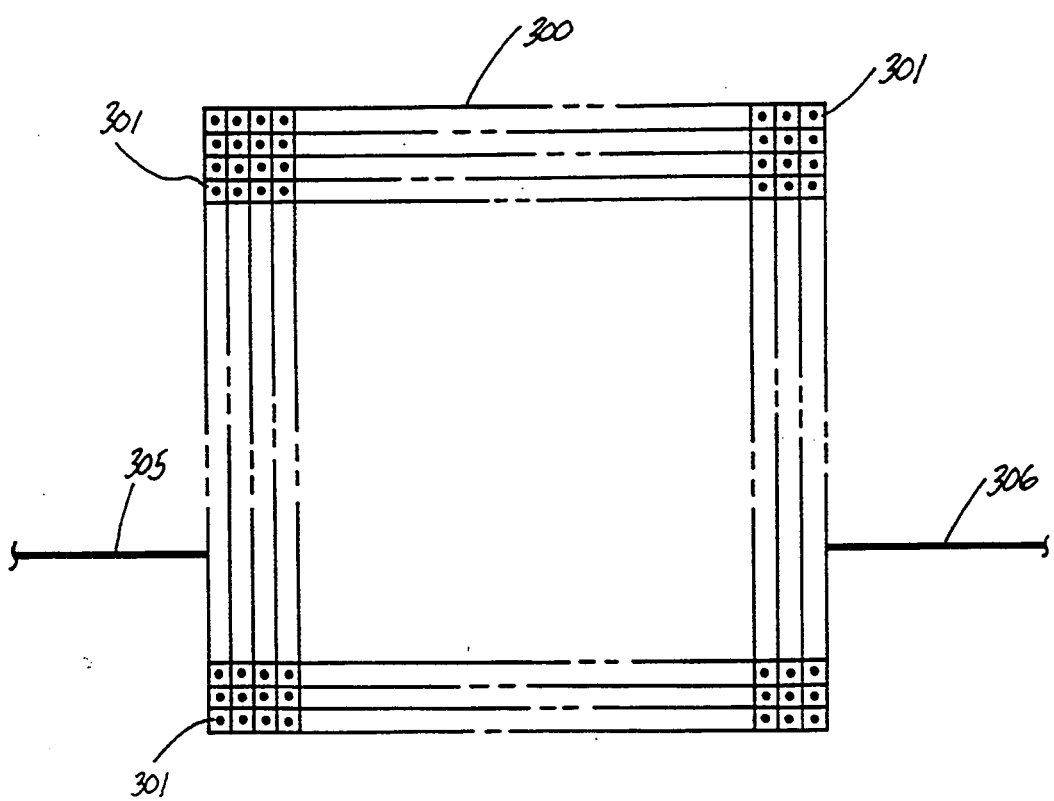
FIG. 14 is a plan view of a sensor array comprising a plurality of sensors.

FIG. 14 shows a sensor array 300 a plurality which may be produced using the processes described herein as a single device having a plurality of individual sensors 301. Each of the sensors may be a sensor of the type as shown for example in FIGS. 1, 2 and 10. The array may be made to various sizes with several hundred or several thousand individual sensors. Depending on the actual size of each of the sensors, several thousand of the sensors may be formed in a single array which measures less than 1 square centimeter. The entire array is formed in one process, the stationary cone electrodes are all formed on a common substrate and the flexible membrane electrodes are all formed in a layer of semiconductor material. Consequently, the membranes and the cones of the plurality of individual sensors are effectively connected in parallel. A single output conductor 305 is connected to the top layer forming the membranes and a single output conductor 306 is connected to the common substrate. The multiple sensor array provides a greater sensor output current and small variations in the applied force, e.g. an acceleration force, are more readily detectable. Furthermore, the multiple sensor array provides a redundancy which reduces the sensitivity to yield and failure problems.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. A process for the formation of an electrode comprising the steps of:
   forming a first insulating layer on a support surface of a single crystal semiconductor substrate;
   forming a support layer on the first insulating layer such that the first insulating layer is disposed between the substrate and the support layer;
   forming an aperture in the support layer and the first insulating layer to expose a portion of the support surface of the substrate; and
   directing a stream of semiconductor atoms at the support layer aperture in a direction substantially normal to the exposed portion of the substrate to epitaxially grow a single crystal semiconductor electrode having a broad base mounted on the support surface and a pointed tip spaced from the broad base.

2. A process for the formation of an electrode according to claim 1 wherein the semiconductor is selected from the group consisting of silicon, gallium arsenide, gallium phosphide, aluminum gallium arsenide, gallium antimonide, aluminum antimonide, indium phosphide, indium gallium arsenide, indium arsenide and indium antimonide.

3. A process for the formation of an electrode according to claim 1 where in the single crystal semiconductor electrode is grown in an environment having a pressure in the range of $10^{-10}$ to $10^{-8}$ Torr.

4. A process for the formation of an electrode according to claim 1 further comprising the step of directing a stream of semiconductor atoms at the support layer in a direction substantially normal to the support layer to deposit a top member on the support layer, wherein the top member fully encloses the aperture of the support layer and is spaced from the tip of the single crystal semiconductor electrode.

5. A process for the formation of an electrode according to claim 1 further comprising the step of introducing an n-doping element into the stream of semiconductor atoms to epitaxially grow an n-doped single crystal semiconductor electrode.

6. A process for the formation of an electrode according to claim 1 further comprising the steps of:
   forming a top member on the support layer such that the support layer is disposed between the top member and first insulating layer;
   forming a second insulating layer on the top member such that the top member is disposed between the second insulating layer and the support layer;
   forming a recess in the second insulating layer; and
   removing a portion of the support layer and the top member to create a cantilever arm, the cantilever arm being supported adjacent the single crystal semiconductor electrode.

7. A process for the formation of an electrode according to claim 1 further comprising the step of directing a stream of semiconductor atoms at the support layer at an acute angle which permits deposition of the semiconductor atoms on the support layer and surrounding the aperture, but prevents deposition on the exposed portion of the substrate.

8. A process for the formation of an electrode according to claim 1 and further comprising the step of forming an aperture in the insulating layer which is larger than the aperture formed in the support layer, the insulating aperture being formed prior to the step of directing the stream of atoms at the support layer aperture.

9. A process for the formation of an electrode comprising the steps of:
   forming a first insulating layer on a support surface of a single crystal semiconductor substrate;
   forming a support layer on the first insulating layer such that the first insulating layer is disposed between the substrate and the support layer;
   forming an aperture in the support layer and the first insulating layer to expose a portion of the support surface of the substrate; and
   directing a stream of semiconductor atoms at the support layer aperture in a direction substantially normal to the exposed portion of the substrate to simultaneously, epitaxially grow a single crystal stationary semiconductor electrode mounted on the support surface of the substrate and a resilient electrode mounted to the support layer, the stationary electrode having a base mounted to the support surface and a tip spaced therefrom and the resilient electrode spanning the aperture in the support layer a spaced distance from the tip of the stationary electrode.

10. A process for the formation of an electrode according to claim 9 wherein the aperture formed in the support layer and the insulating layer is circular resulting in a conically shaped single crystal stationary semiconductor electrode grown epitaxially by the stream of atoms.

11. A process for the formation of an electrode comprising the steps of:
   forming a first insulating layer on a single crystal semiconductor substrate;

forming a support layer on the first insulating layer such that the first insulating layer is disposed between the substrate and the support layer;

forming an aperture in the support layer and the first insulating layer to expose a portion of the substrate;

directing a stream of semiconductor atoms at the support layer aperture in a direction substantially normal to the exposed portion of the substrate to epitaxially grow a single crystal semiconductor electrode;

forming a top member on the support layer such that the support layer is disposed between the top member and first insulating layer;

forming a second insulating layer on the top member such that the top member is disposed between the second insulating layer and the support layer;

forming a recess in the second insulating layer; and removing a portion of the support layer and the top member to create a cantilever arm, the cantilever arm being supported adjacent the single crystal semiconductor electrode.

12. A process for the formation of an electrode comprising the steps of:

forming a first insulating layer on a single crystal semiconductor substrate;

forming a support layer on the first insulating layer such that the first insulating layer is disposed between the substrate and the support layer;

forming an aperture in the support layer and the first insulating layer to expose a portion of the substrate;

directing a stream of semiconductor atoms at the support layer aperture in a direction substantially normal to the exposed portion of the substrate to epitaxially grow a single crystal semiconductor electrode; and directing a stream of semiconductor atoms at the support layer at an acute angle which permits deposition of the semiconductor atoms on the support layer and surrounding the aperture, but prevents deposition on the exposed portion of the substrate.

* * * * *